United States Patent [19]
Shackle

[11] Patent Number: 5,300,373
[45] Date of Patent: Apr. 5, 1994

[54] ELECTROCHEMICAL CELL STACK AND METHOD OF MAKING AN ELECTROCHEMICAL CELL STACK

[75] Inventor: Dale R. Shackle, Morgan Hill, Calif.

[73] Assignee: Valence Technology, Inc., San Jose, Calif.

[21] Appl. No.: 943,722

[22] Filed: Sep. 11, 1992

[51] Int. Cl.$^5$ ............................................. H01M 8/18
[52] U.S. Cl. .................................. 429/152; 429/154; 429/160
[58] Field of Search ........................ 429/152, 154, 160

[56] References Cited

U.S. PATENT DOCUMENTS

| | | |
|---|---|---|
| 4,032,697 | 6/1977 | Beauchamp et al. |
| 4,830,940 | 5/1989 | Keister et al. ......................... 429/194 |
| 4,879,190 | 11/1989 | Lundsgaard ............................ 429/94 |

Primary Examiner—Prince Willis, Jr.
Assistant Examiner—M. Nuzzolillo
Attorney, Agent, or Firm—Robert E. Krebs

[57] ABSTRACT

An electrochemical cell stack is made from a continuous laminate web including an electrode layer, an electrolyte layer, and a plurality of discrete opposite polarity electrode segments. The laminate is fan-folded into a stack such that substantially the entire surface area of the opposite polarity electrode segments are in contact with the electrolyte layer and in ion exchange with the electrode layer. Current can collected from the discrete opposite polarity electrode segments by opposite polarity electrode current collector strips that electrically connect the opposite polarity electrode segments. A method for making an electrochemical cell stack is also disclosed.

31 Claims, 18 Drawing Sheets

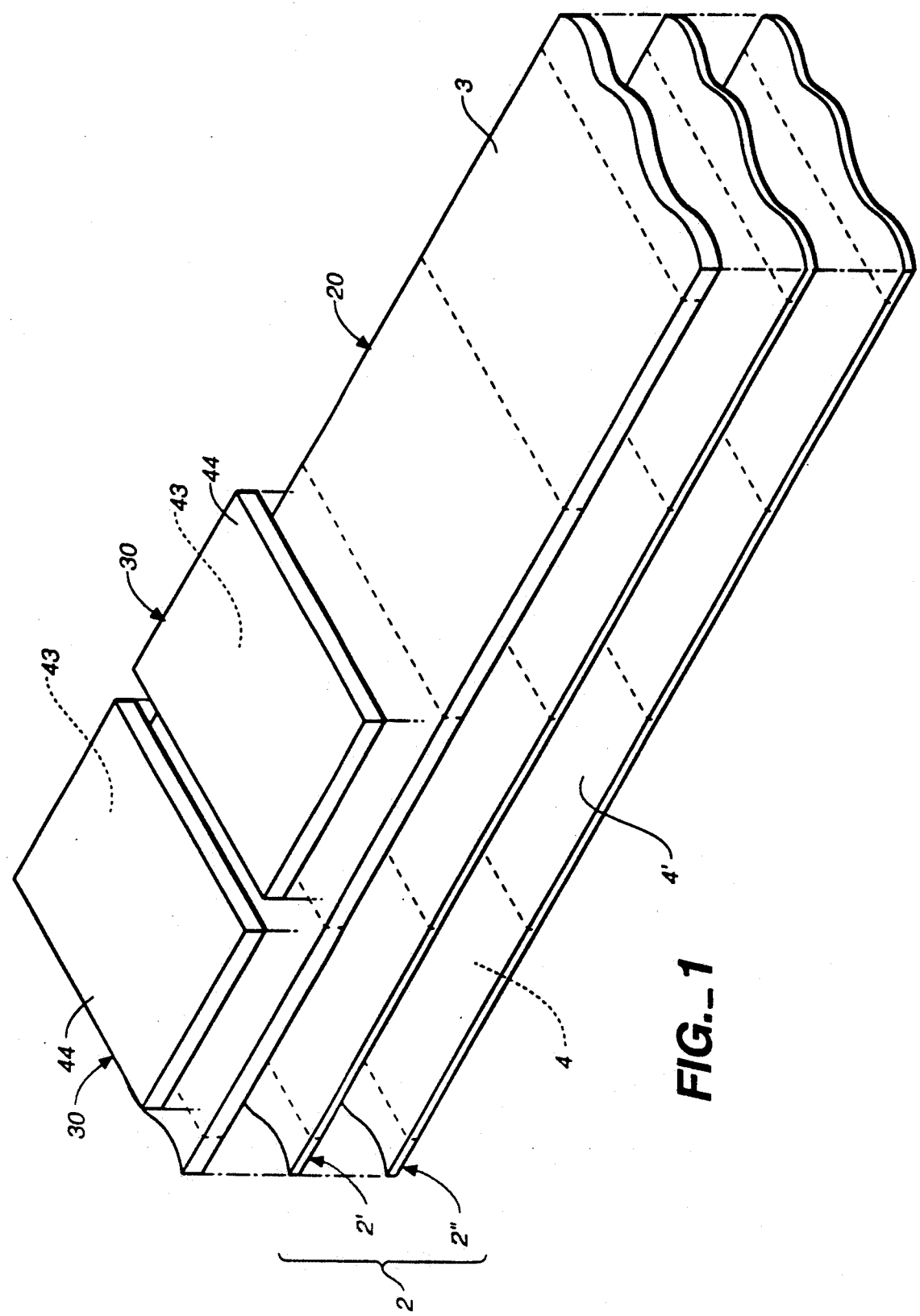
FIG._1

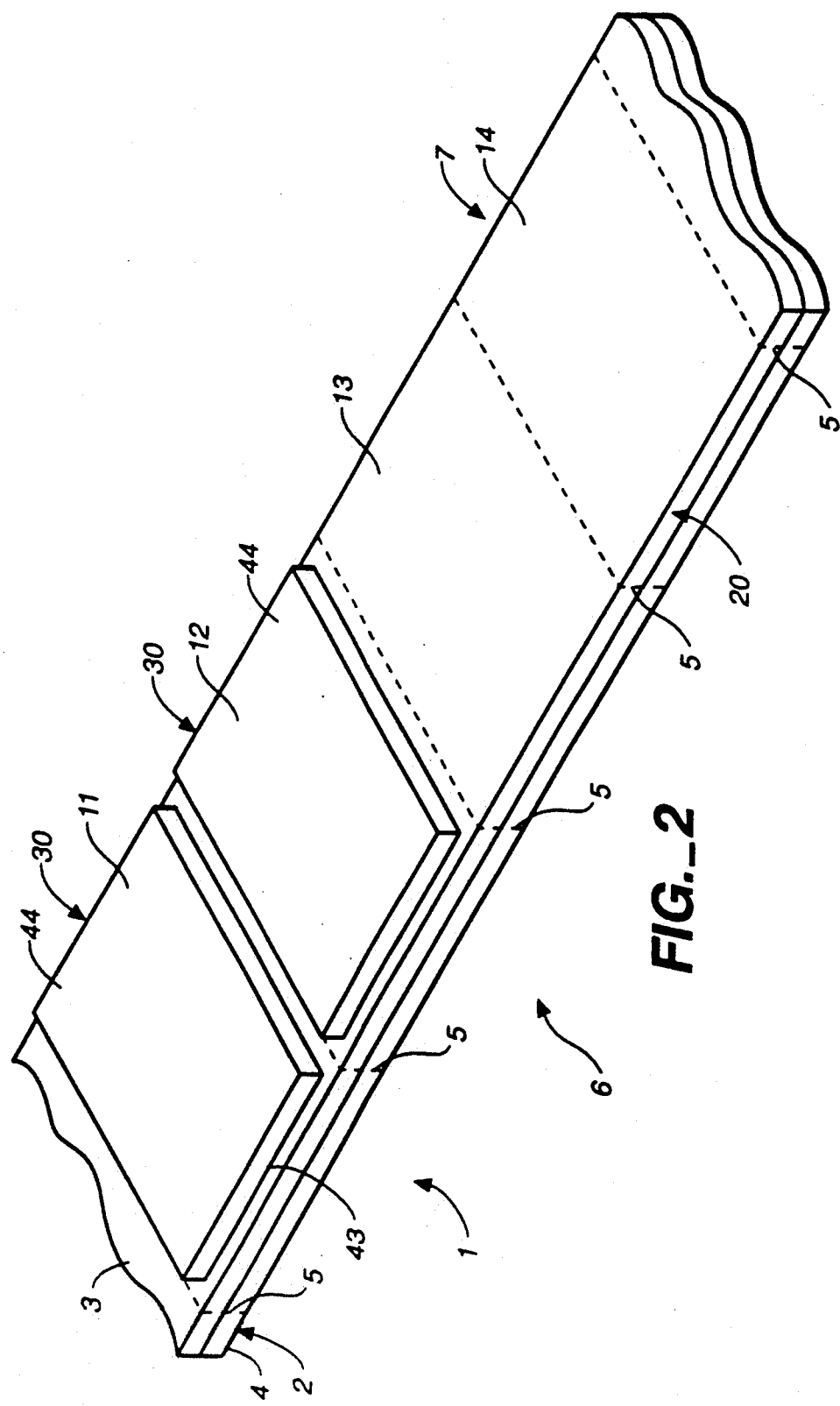
FIG._2

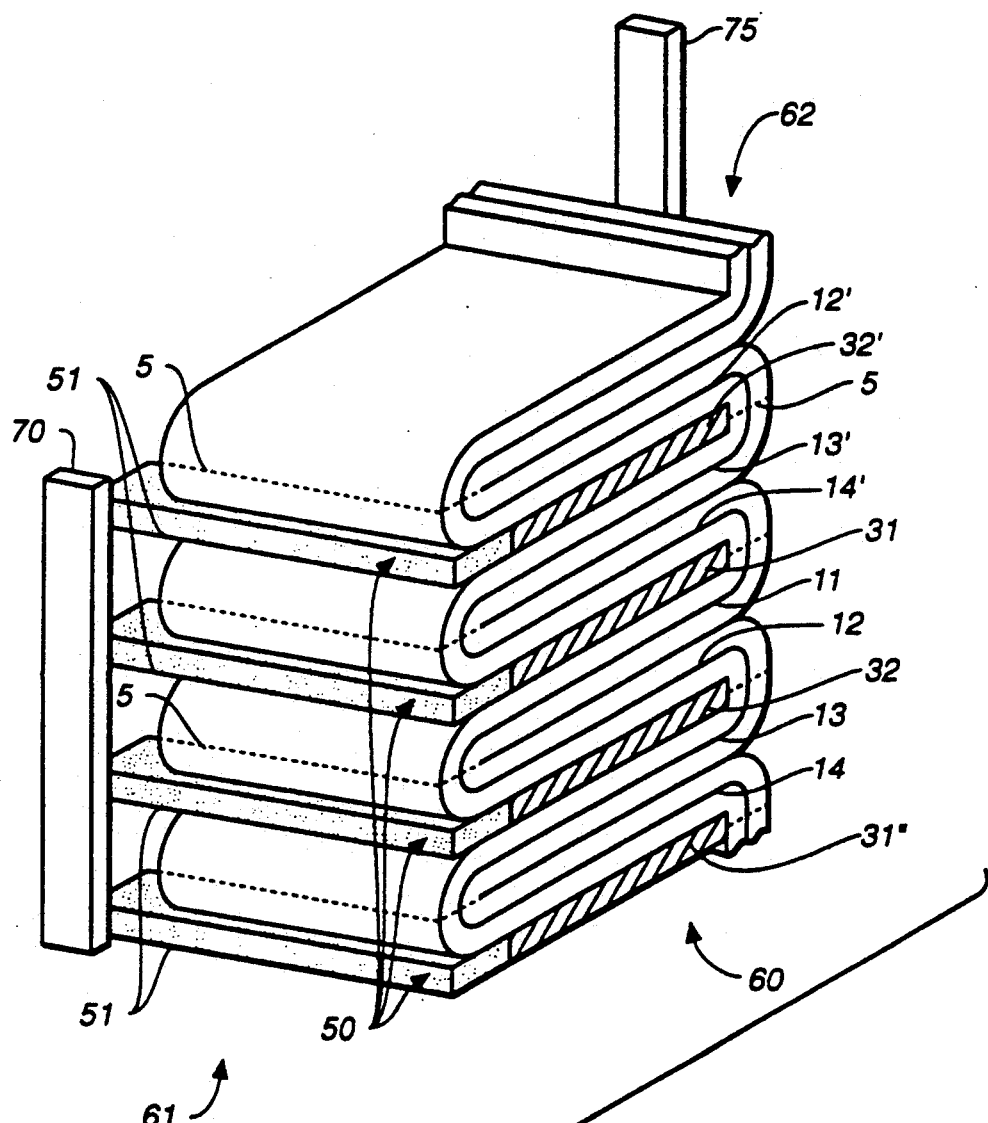
FIG._3

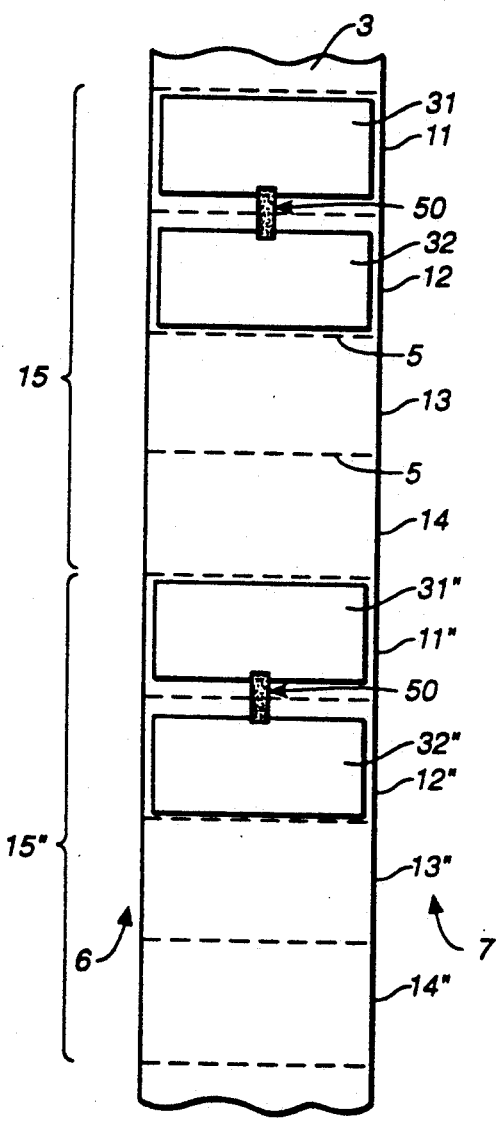
FIG._4A
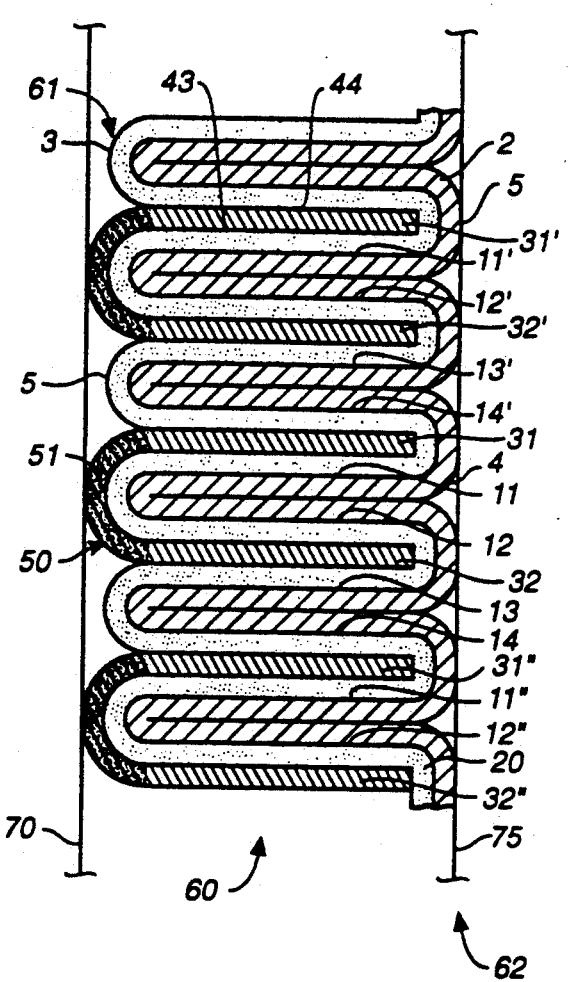
FIG._4B

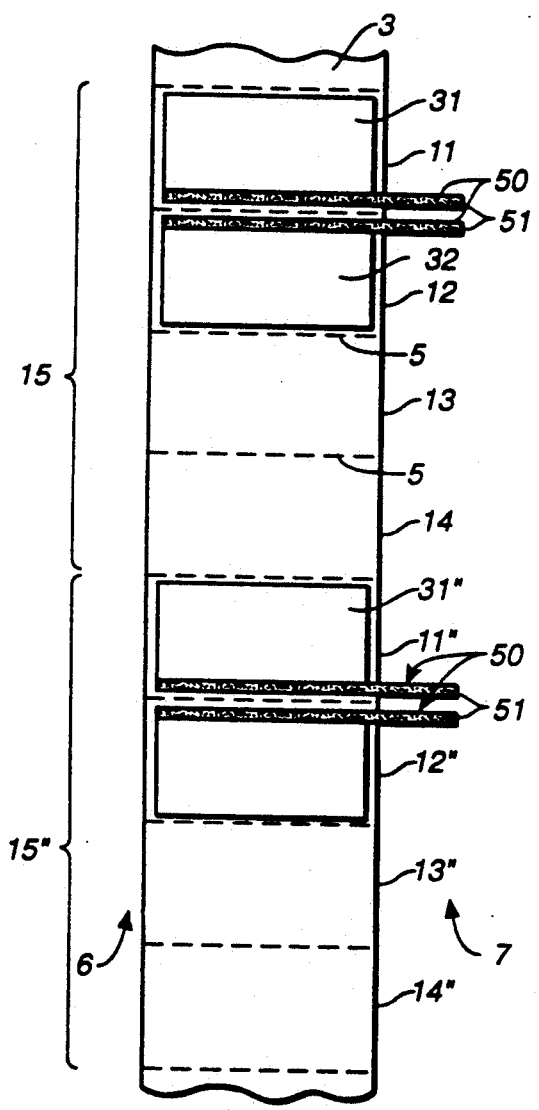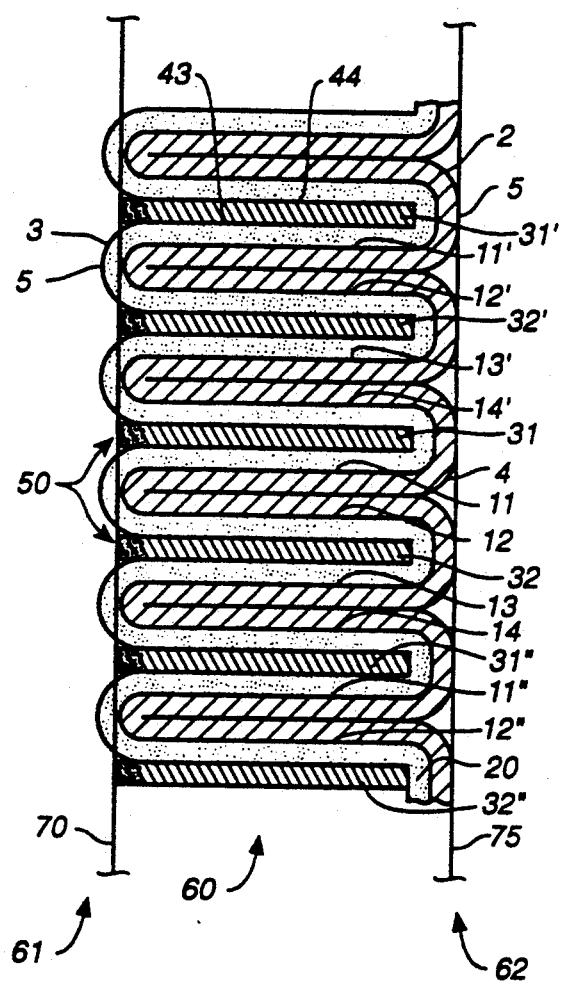
FIG._5A  FIG._5B

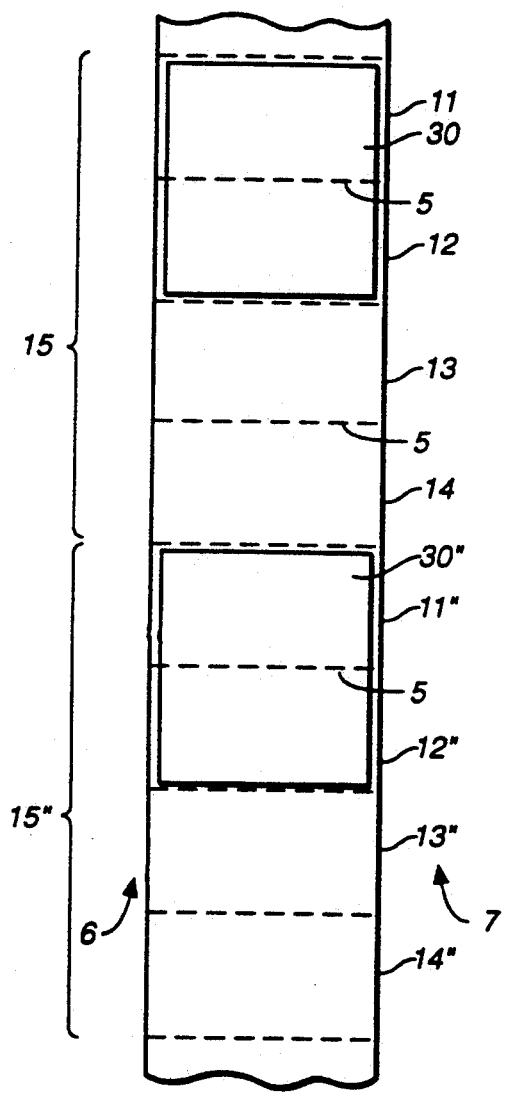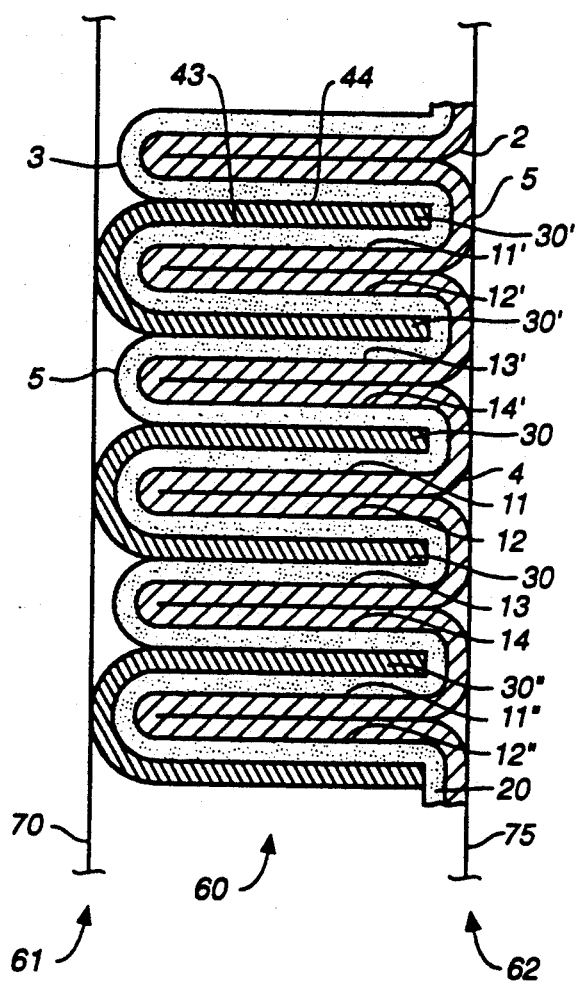
FIG._6A
FIG._6B

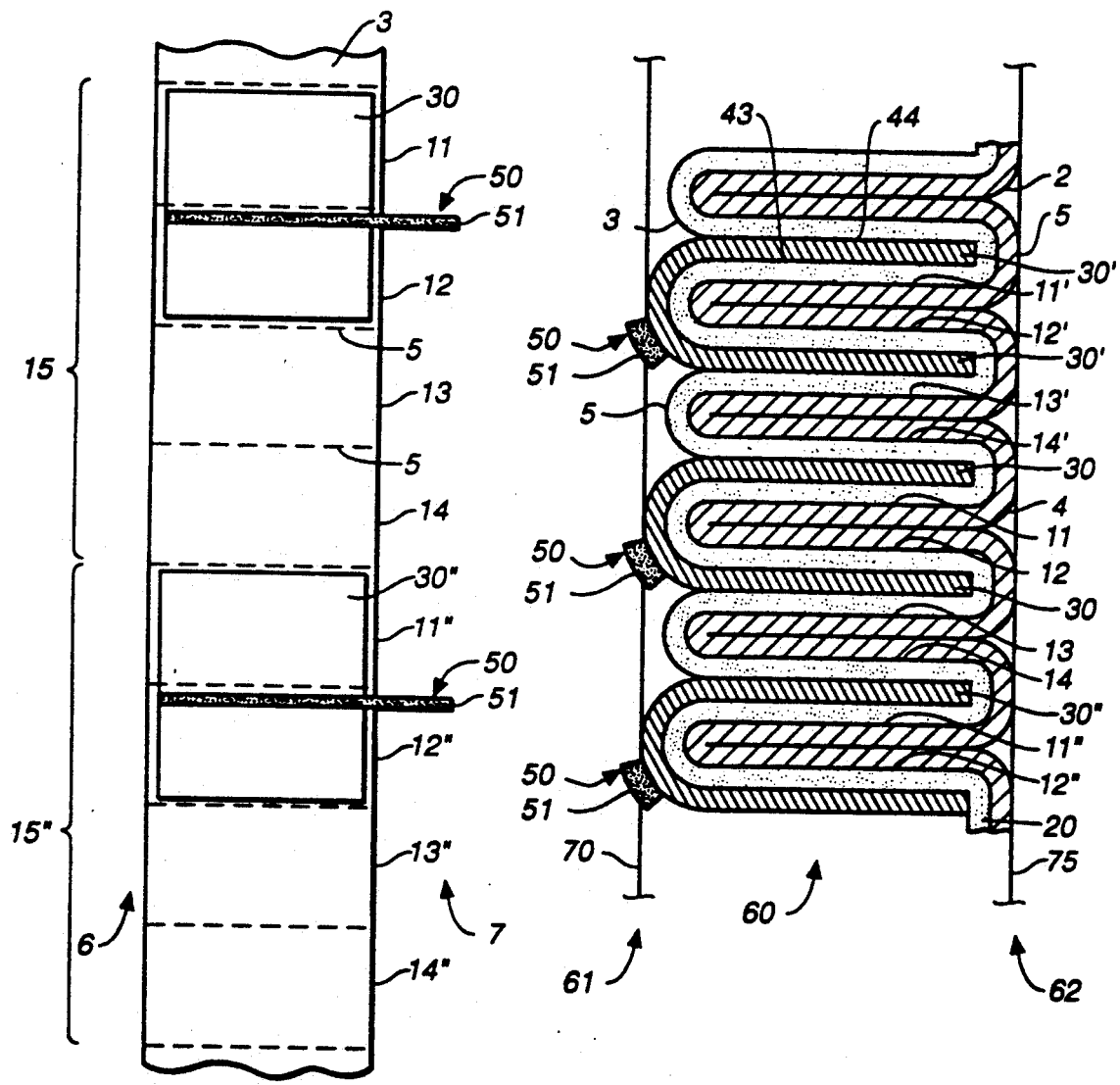
FIG._7A    FIG._7B

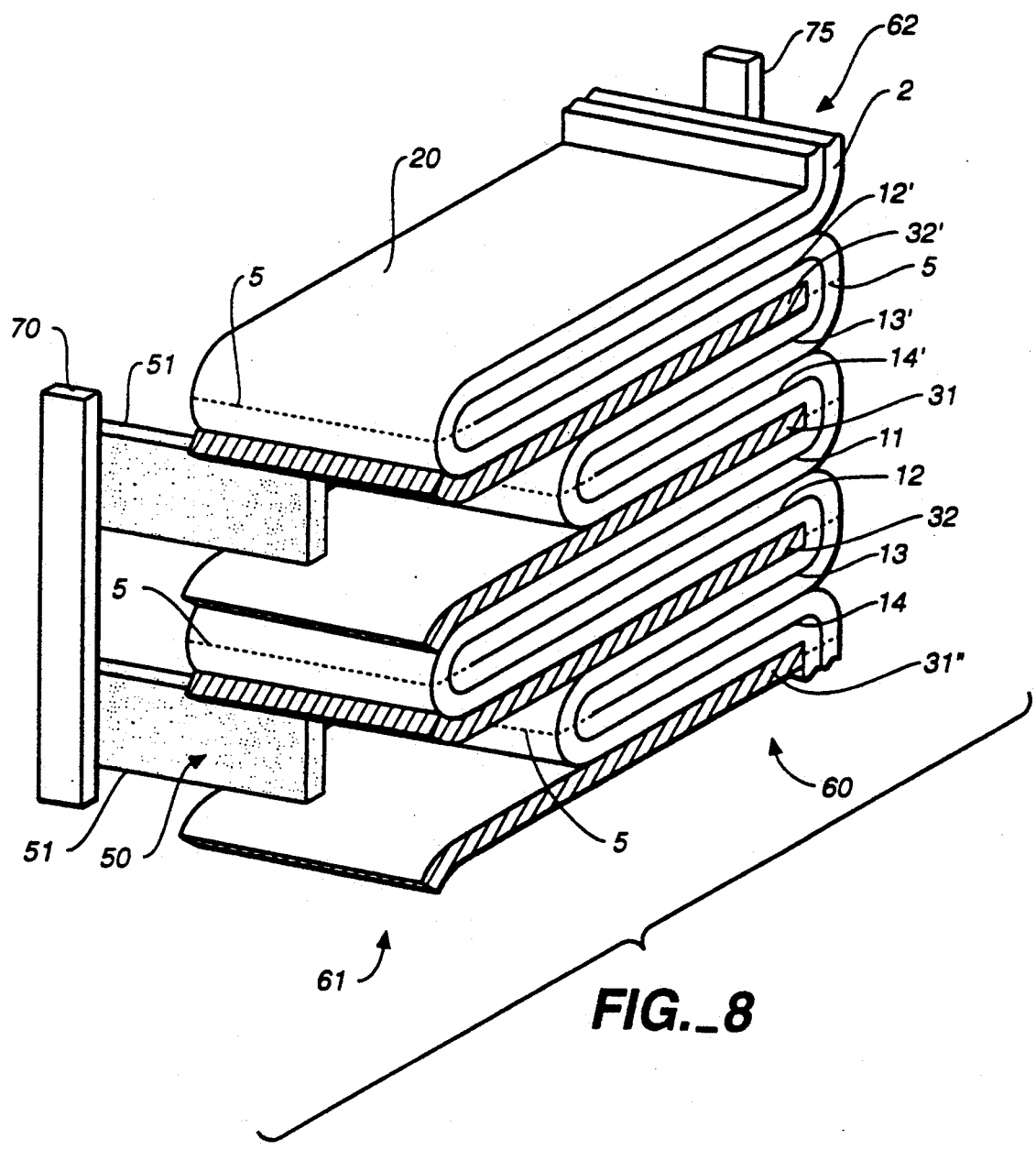
FIG._8

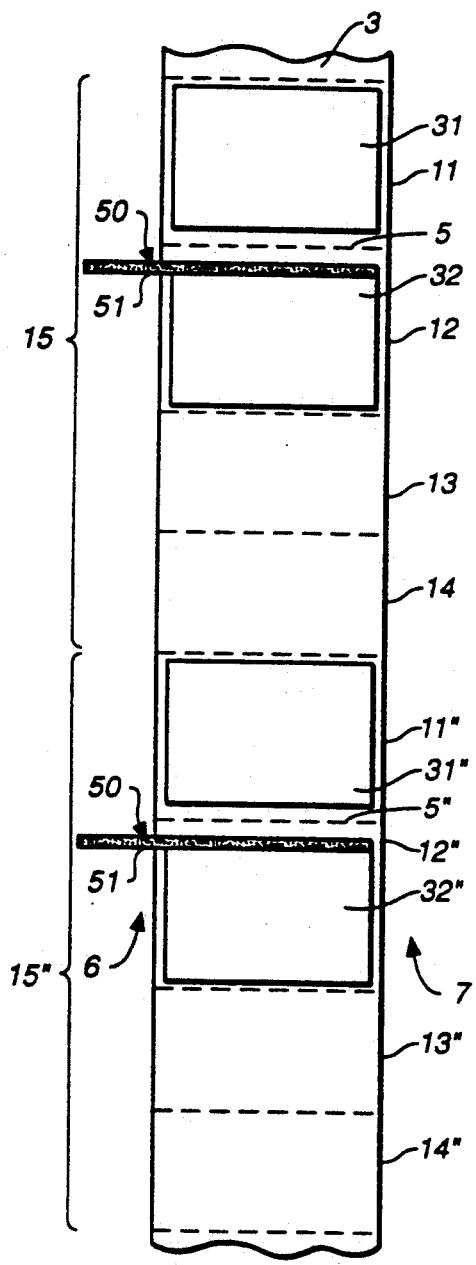
FIG._9A
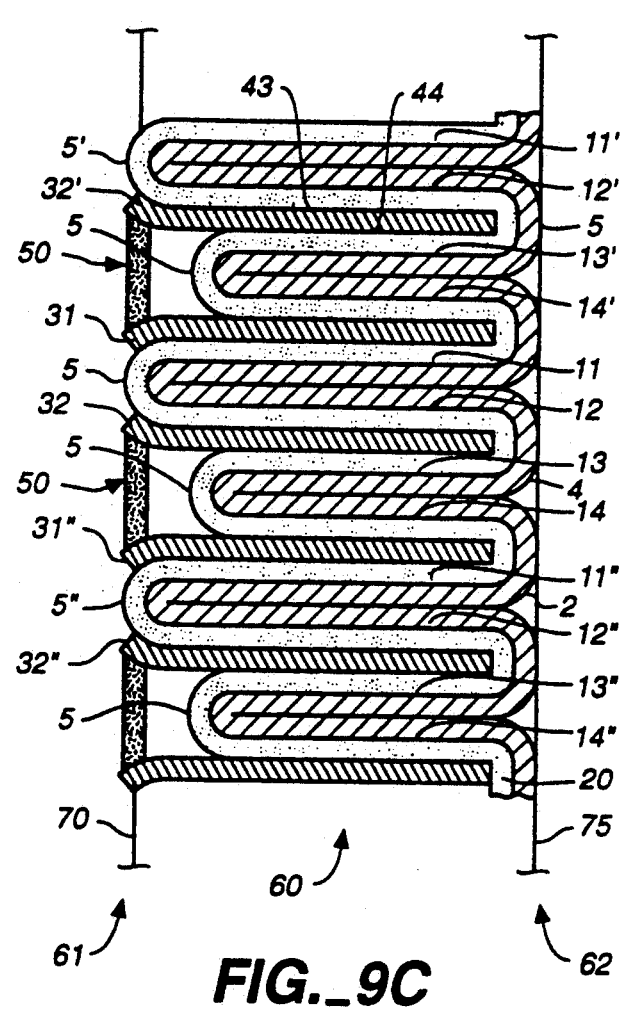
FIG._9C

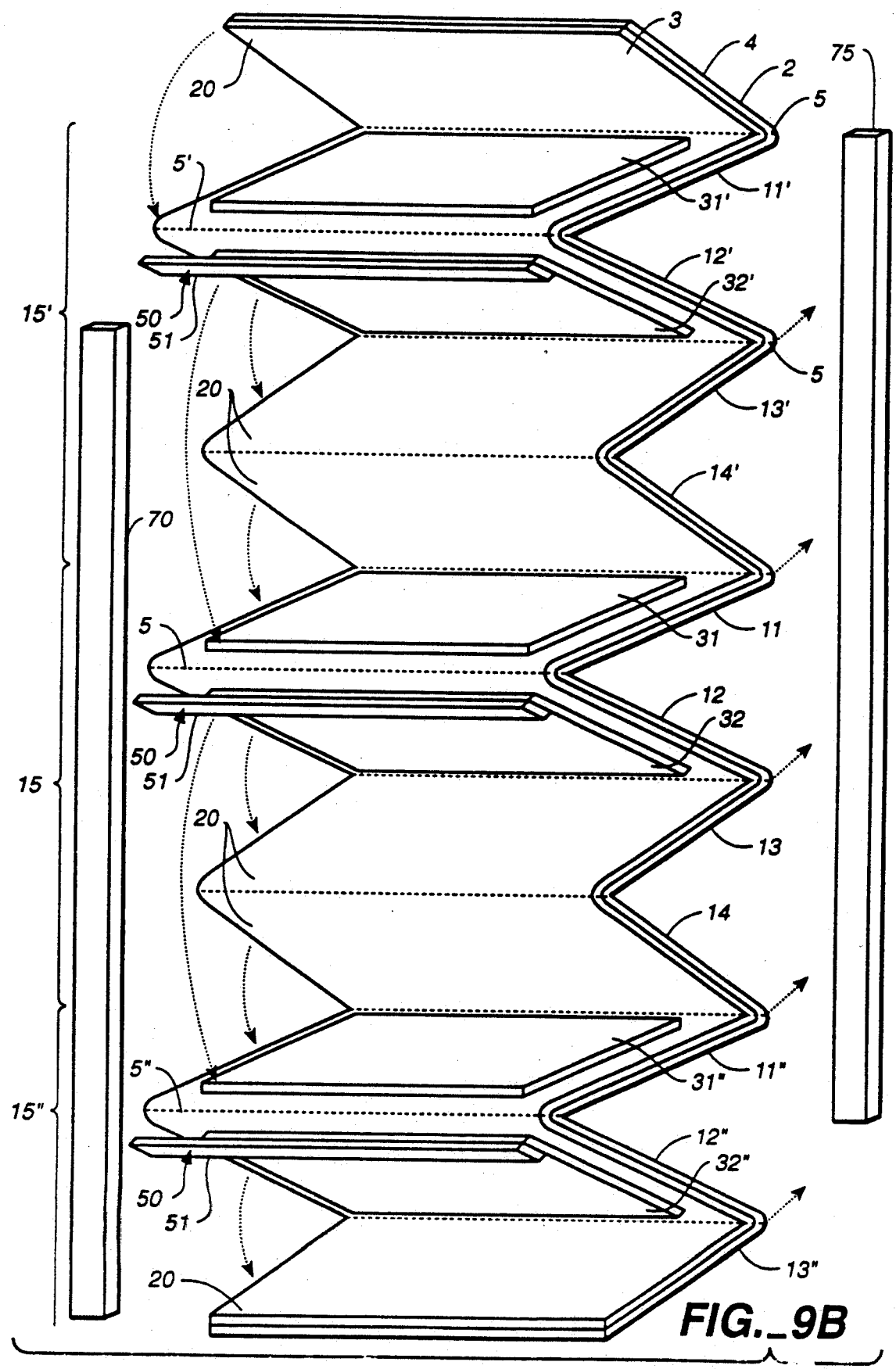
FIG._9B

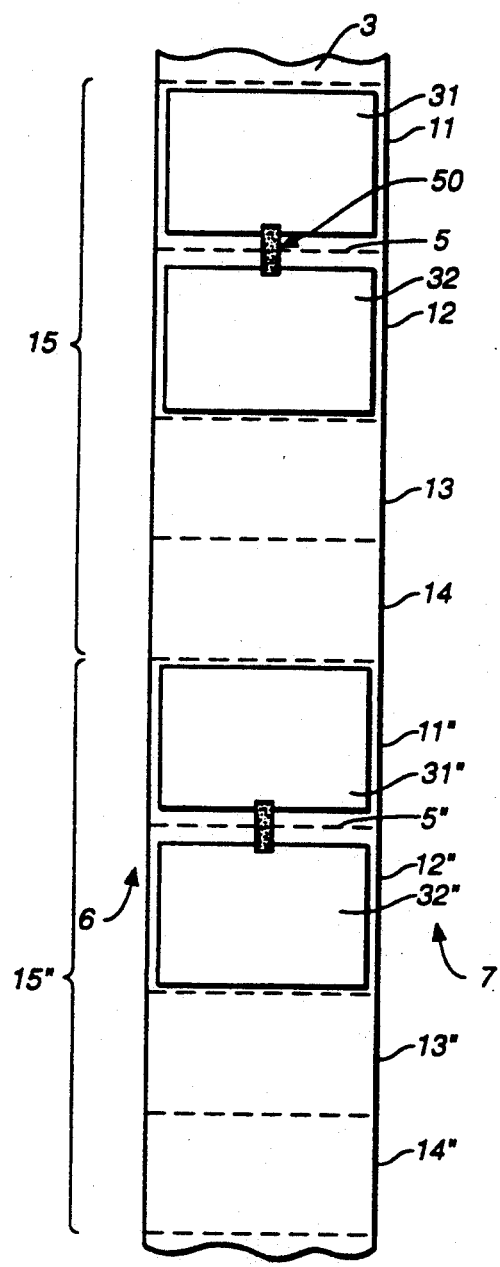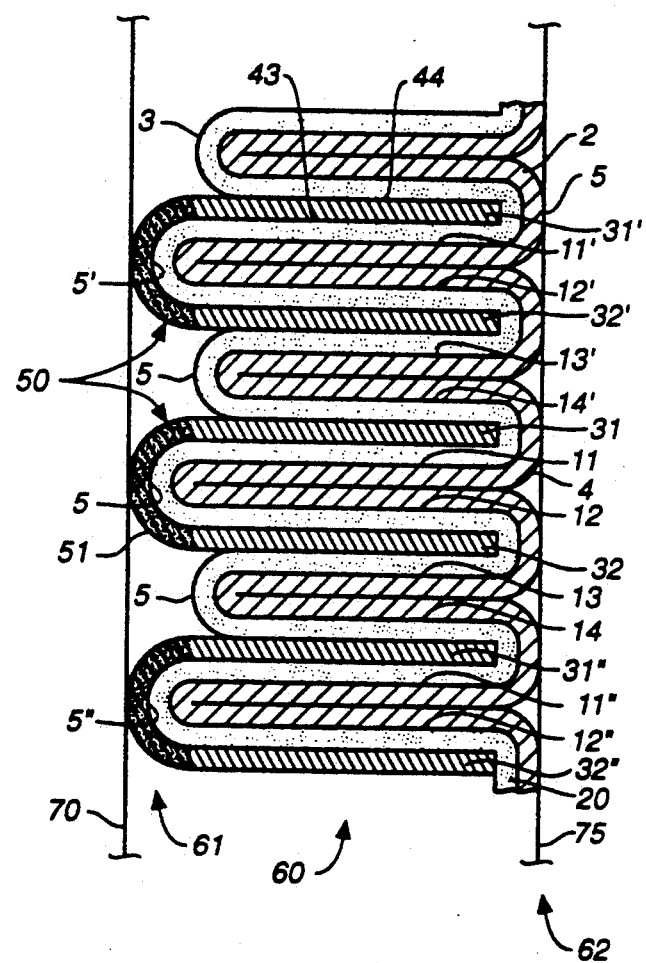
FIG._10A
FIG._10C

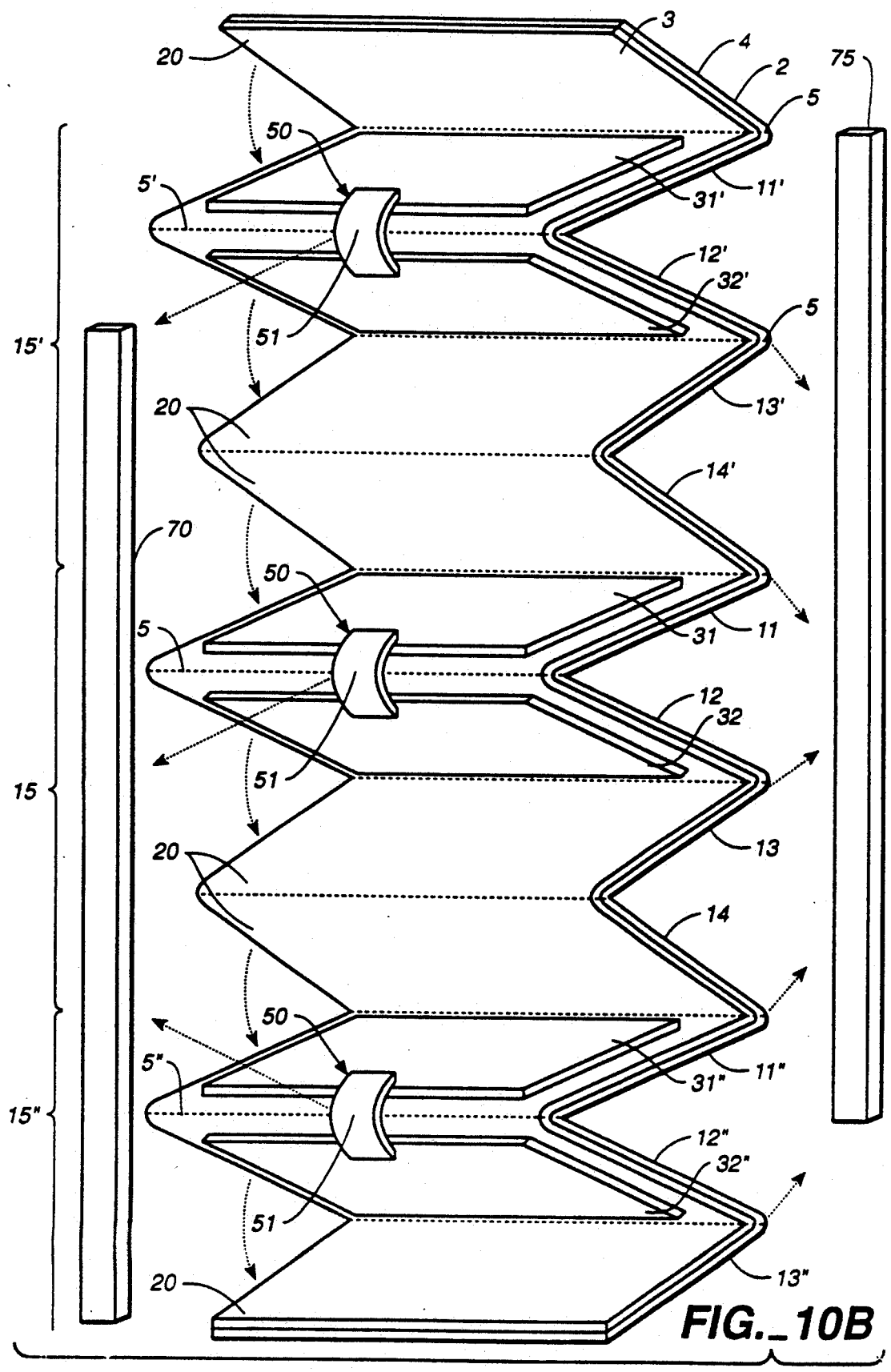
FIG._10B

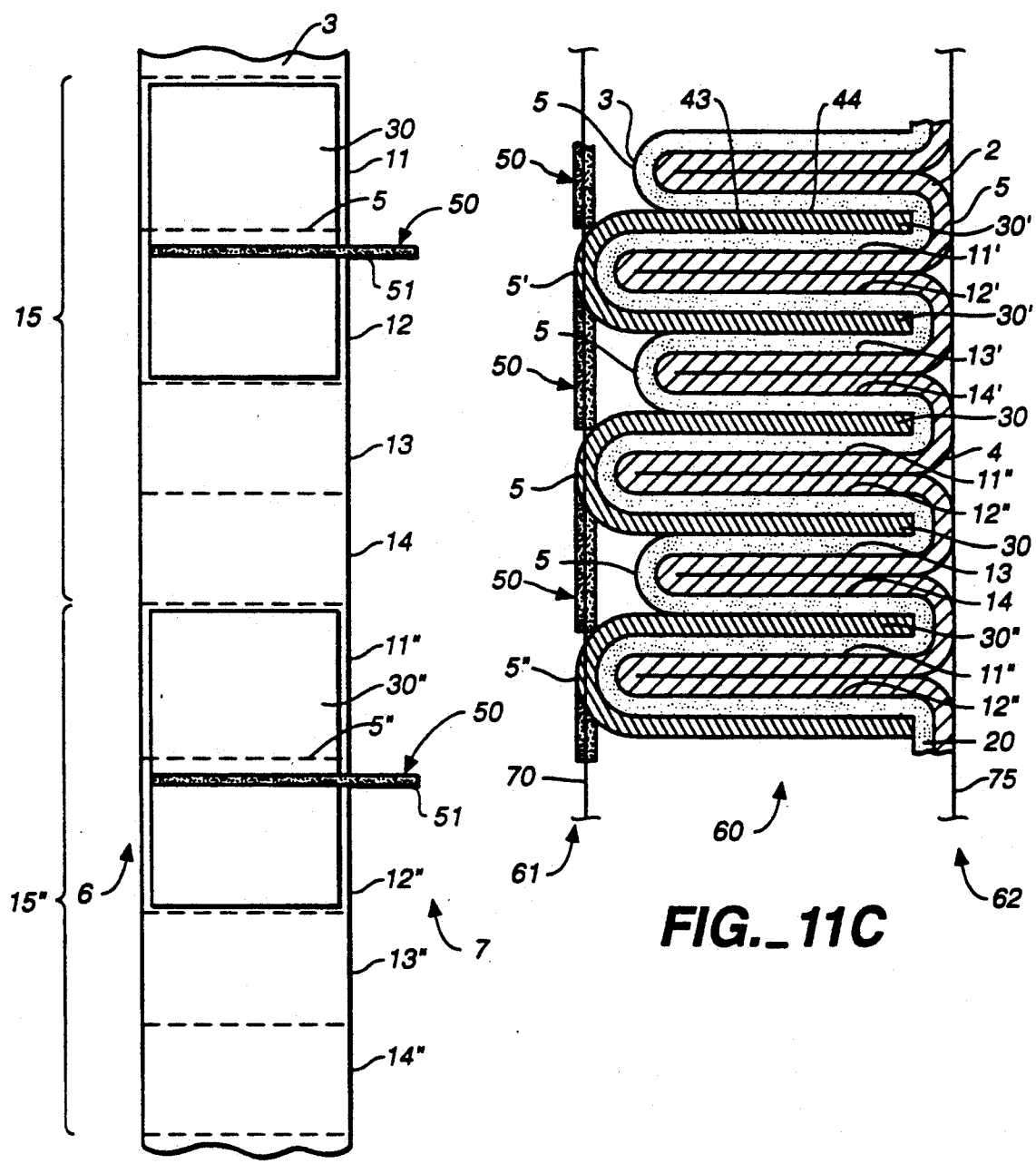
FIG._11A
FIG._11C

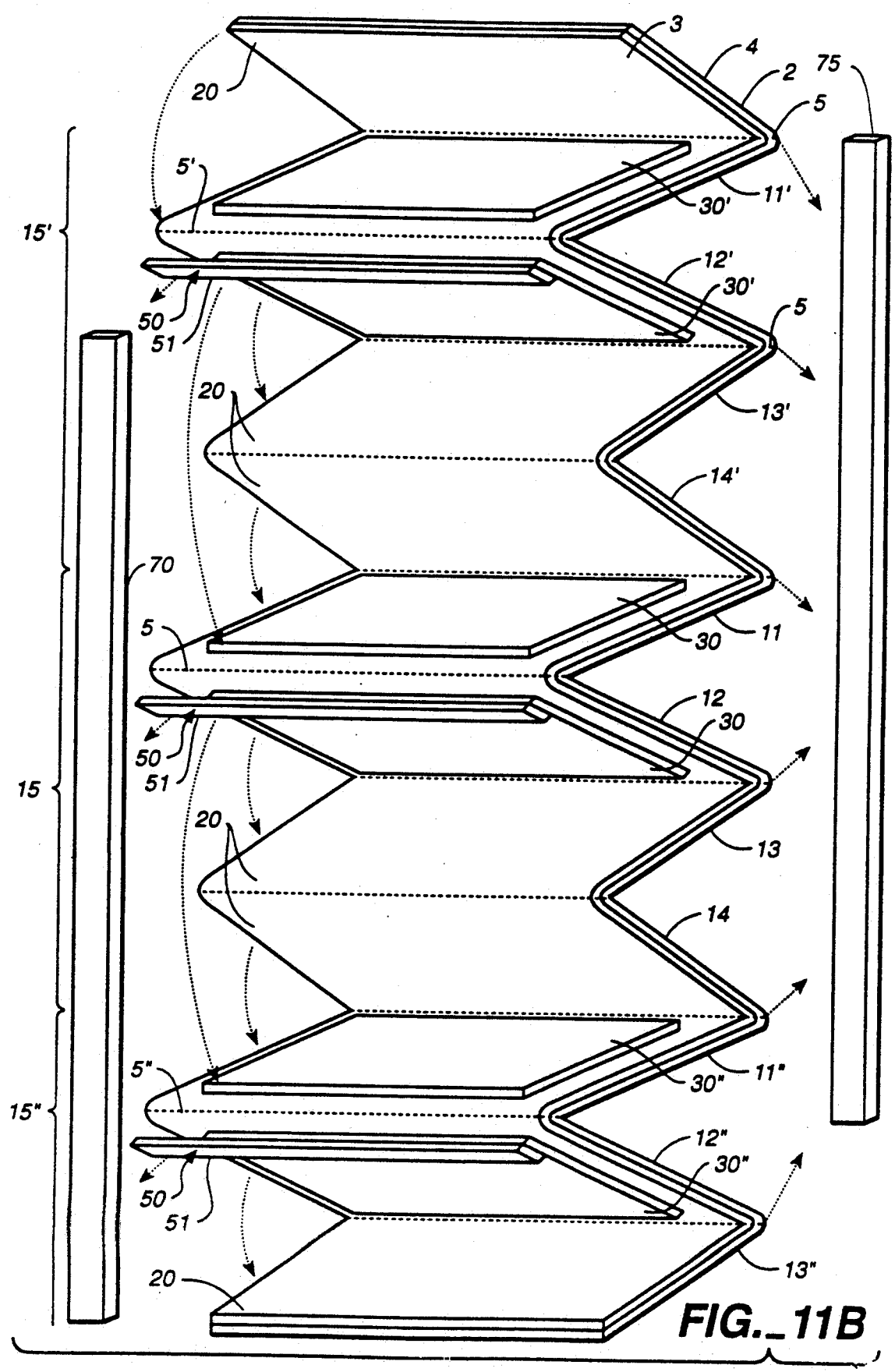
FIG._11B

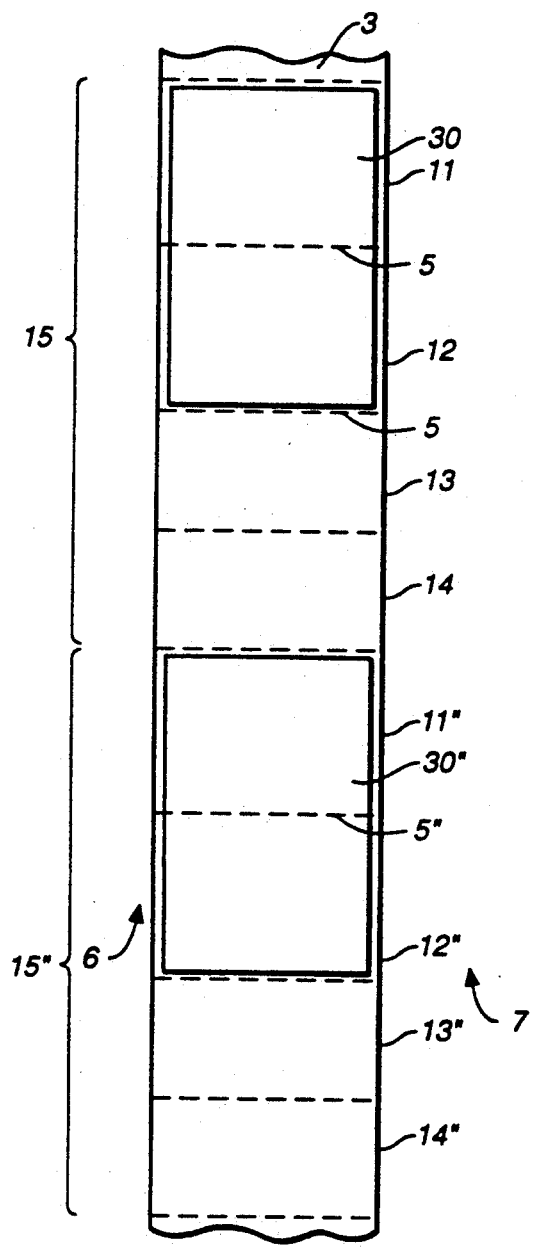
FIG._12A
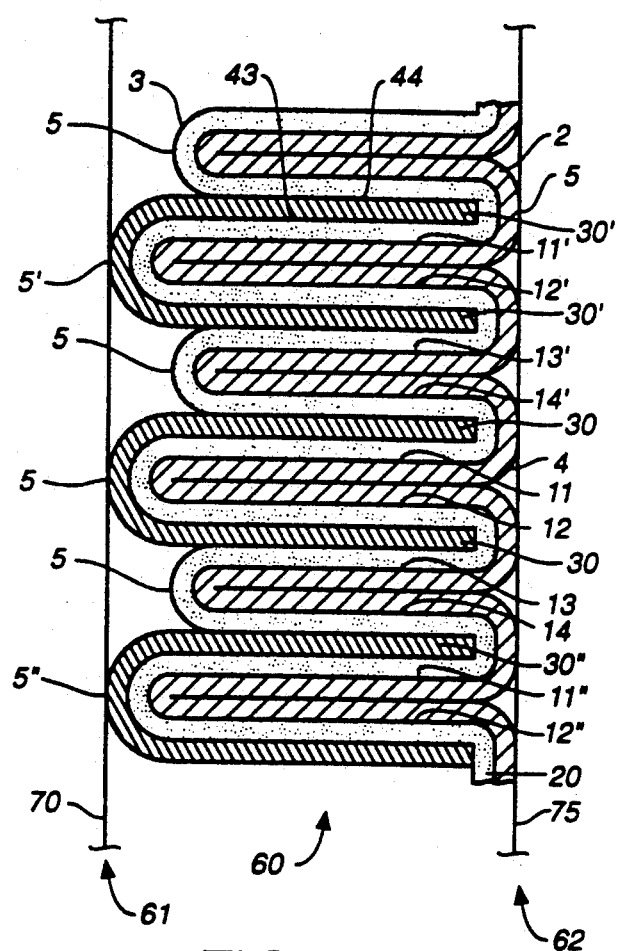
FIG._12C

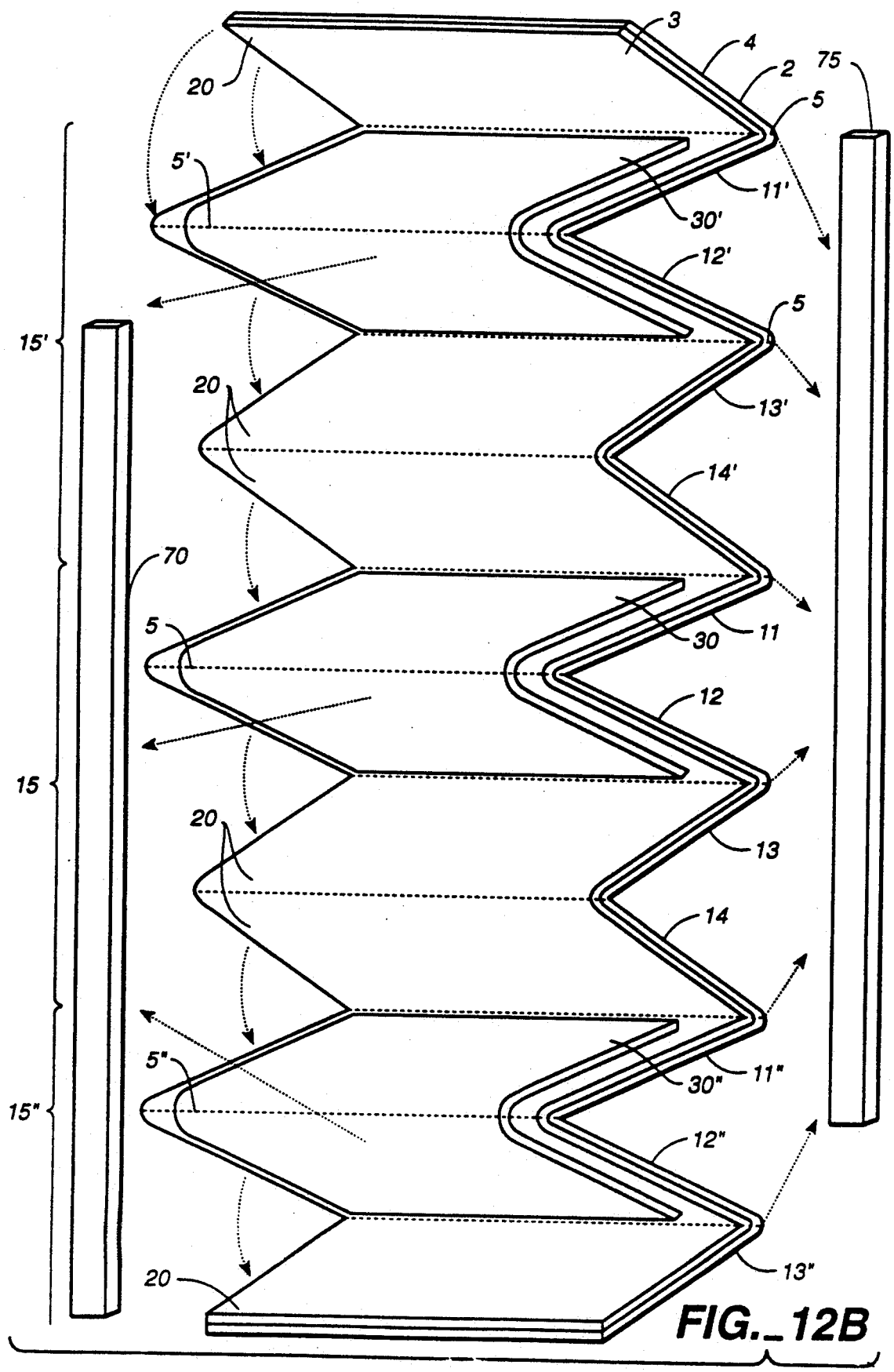
FIG._12B

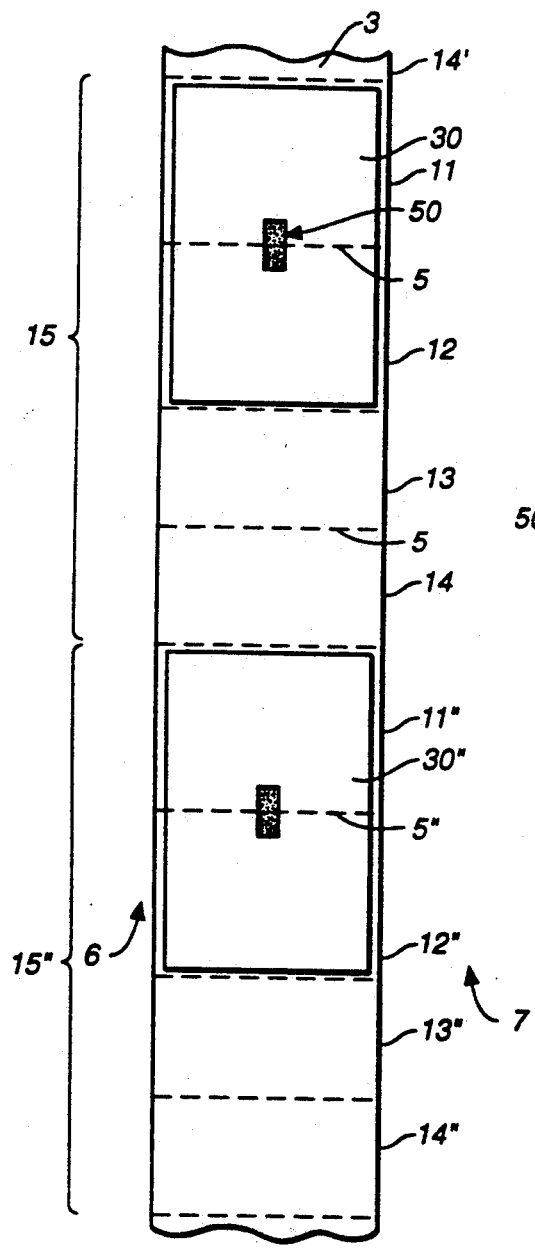
FIG._13A
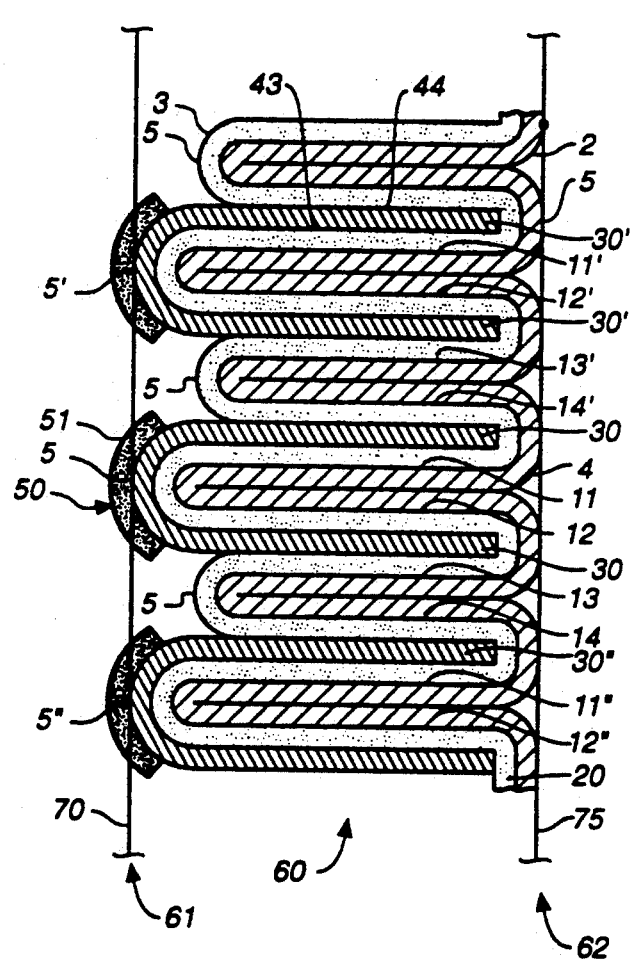
FIG._13C

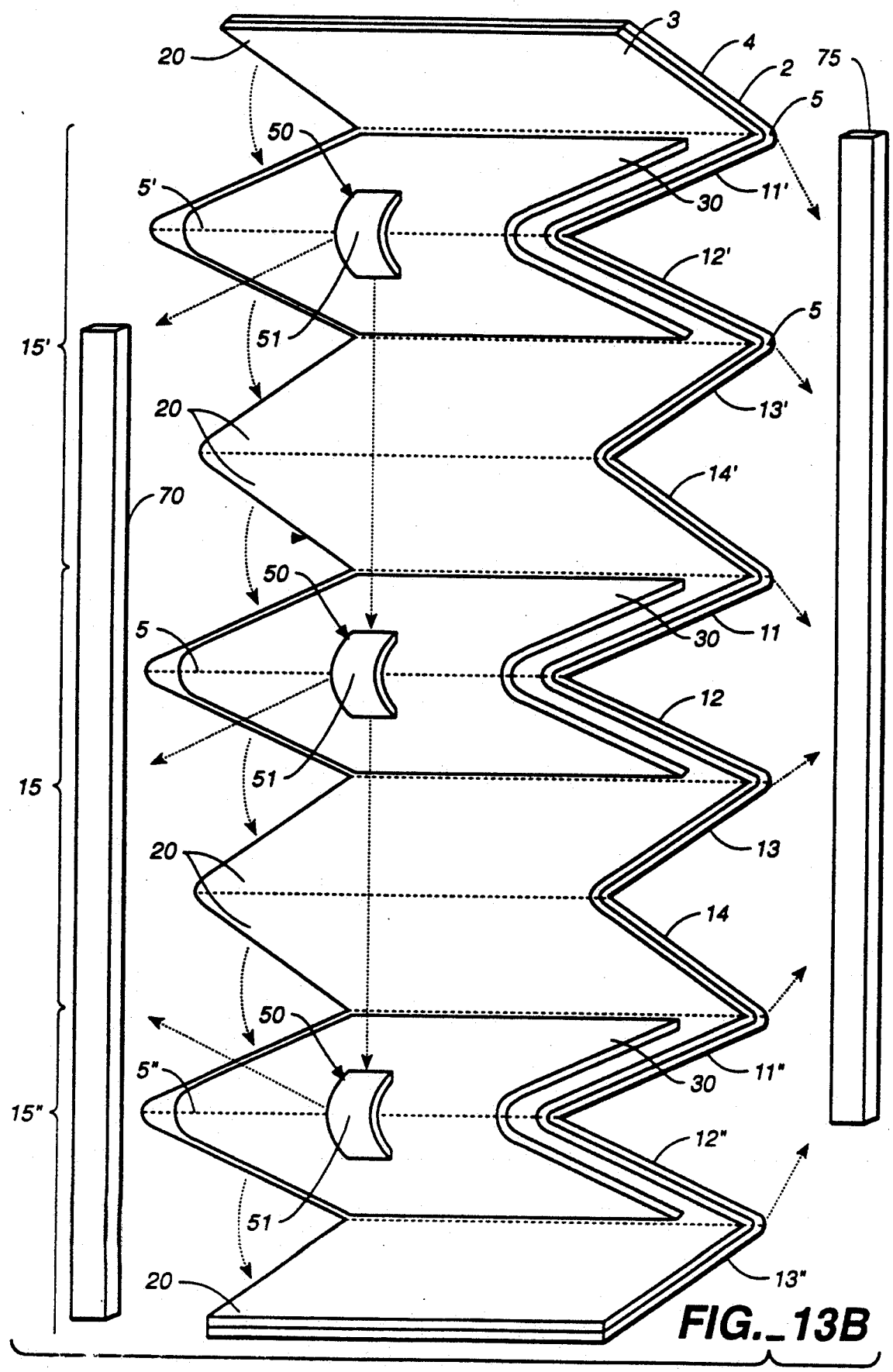
FIG._13B

ELECTROCHEMICAL CELL STACK AND METHOD OF MAKING AN ELECTROCHEMICAL CELL STACK

BACKGROUND OF THE INVENTION

1. Field of the Invention

The present invention generally relates to electrochemical cells and, more particularly, to electrochemical cells utilizing a polymer electrolyte.

2. State of the Art

In recent years, workers in the battery art have begun to appreciate the advantages of solid-state cells, particularly cells having a lithium anode, a cathode, and a polymer electrolyte have become known. The advantages of those cells include lower weight than conventional batteries using a liquid electrolyte, long service life, relatively high energy densities, and relatively high specific energies.

SUMMARY OF THE INVENTION

The present invention generally provides an electrochemical cell having a polymer electrolyte that can be assembled relatively simply into a stack having desired power characteristics such as high energy density in terms of Watt-hours per kilogram and Watt-hours per liter. More particularly, the present invention provides a fan-folded electrochemical cell stack having a plurality of discrete electrode segments that are easily adapted to contact one another.

In one of its embodiments, the electrochemical cell stack of present invention includes a continuous laminate web having a continuous electrode layer, a continuous electrolyte layer, and a plurality of discrete opposite polarity electrode segments secured on top of the electrolyte layer in predetermined locations. The continuous laminate web is fan-folded at predetermined fold positions such that the opposite polarity electrode segments contact an electrolyte layer on the top and bottom sides of each of the opposite polarity electrode segments. The fan-folded continuous laminate web forms a stack having first and second sides. Opposite polarity electrode current collector means for collecting opposite polarity electrode current are provided and electrode current collector means for collecting electrode current are provided. Preferably, the web is fan-folded at the fold positions such that every other fold position on the first side of the fan-folded continuous laminate web extends past a preceding and a succeeding fold position on the first side of the stack a predetermined extended length.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a schematic exploded, perspective view of a laminate for forming an electrochemical cell stack according to an embodiment of the present invention;

FIG. 2 is a schematic perspective view of a laminate for forming an electrochemical cell stack according to an embodiment of the present invention;

FIG. 3 is a schematic perspective view of an electrochemical cell stack according to an embodiment of the present invention;

FIG. 4A is a schematic plan view of a laminate for forming an electrochemical cell stack according to an embodiment of the present invention;

FIG. 4B is a schematic cross-sectional view of an electrochemical cell stack manufactured from the laminate of FIG. 4A;

FIG. 5A is a schematic plan view of a laminate for forming an electrochemical cell stack according to an embodiment of the present invention;

FIG. 5B is a schematic cross-sectional view of an electrochemical cell stack manufactured from the laminate of FIG. 5A;

FIG. 6A is a schematic plan view of a laminate for forming an electrochemical cell stack according to an embodiment of the present invention;

FIG. 6B is a schematic cross-sectional view of an electrochemical cell stack manufactured from the laminate of FIG. 6A;

FIG. 7A is a schematic plan view of a laminate for forming an electrochemical cell stack according to an embodiment of the present invention;

FIG. 7B is a schematic cross-sectional view of an electrochemical cell stack manufactured from the laminate of FIG. 7A;

FIG. 8 is a schematic perspective view of an electrochemical cell stack according to an embodiment of the present invention;

FIG. 9A is a schematic plan view of a laminate for forming an electrochemical cell stack according to an embodiment of the present invention;

FIG. 9B is a schematic perspective view showing the formation of an electrochemical cell stack from the laminate of FIG. 9A;

FIG. 9C is a schematic cross-sectional view of an electrochemical cell stack manufactured from the laminate of FIG. 9A;

FIG. 10A is a schematic plan view of a laminate for forming an electrochemical cell stack according to an embodiment of the present invention;

FIG. 10B is a schematic perspective view showing the formation of an electrochemical cell stack from the laminate of FIG. 10A;

FIG. 10C is a schematic cross-sectional view of an electrochemical cell stack manufactured from the laminate of FIG. 10A;

FIG. 11A is a schematic plan view of a laminate for forming an electrochemical cell stack according to an embodiment of the present invention;

FIG. 11B is a schematic perspective view showing the formation of an electrochemical cell stack from the laminate of FIG. 11A;

FIG. 11C is a schematic cross-sectional view of an electrochemical cell stack manufactured from the laminate of FIG. 11A;

FIG. 12A is a schematic plan view of a laminate for forming an electrochemical cell stack according to an embodiment of the present invention;

FIG. 12B is a schematic perspective view showing the formation of an electrochemical cell stack from the laminate of FIG. 12A;

FIG. 12C is a schematic cross-sectional view of an electrochemical cell stack manufactured from the laminate of FIG. 12A;

FIG. 13A is a schematic plan view of a laminate for forming an electrochemical cell stack according to an embodiment of the present invention;

FIG. 13B is a schematic perspective view showing the formation of an electrochemical cell stack from the laminate of FIG. 13A; and FIG. 13C is a schematic cross-sectional view of an electrochemical cell stack manufactured from the laminate of FIG. 13A.

DETAILED DESCRIPTION OF THE PREFERRED EMBODIMENTS

In FIGS. 1 and 2, a laminate 1 can be in web or sheet form for forming an electrochemical cell stack 60 such as shown, for instance, in FIGS. 3 and 8. As best shown in FIG. 2, the laminate 1 has a first surface 3 and a second surface 4. The laminate 1 comprises a continuous electrode layer 2, a continuous electrolyte layer 20, and a plurality of discrete opposite polarity electrode segments 30. In the preferred embodiment, the continuous electrode layer 2 is the cathode layer, and the opposite polarity electrode segments 30 is the anode.

As shown in FIG. 1, the cathode layer 2 can be formed by coating a suitable cathode material 2' onto a surface 4' of a conductive web material 2''. In the preferred embodiment, the cathode material 2' is a material such as vanadium oxide, $V_6O_{13}$, and the conductive web material 2'' is a material such as a nickel web. The second surface 4 is on the opposite surface of the conductive web material 2'' from the surface 4' onto which the cathode material 2' is coated. The electrolyte layer 20 can be formed by coating a polymer electrolyte material over the cathode material 2'. The electrolyte layer 20 forms the first surface 3 of the laminate 1.

The anode segments 30 are secured at predetermined locations on the first surface 3. The anode segments 30 can comprise a foil material with a desired electrochemical potential. The anode segments 30 are preferably lithium foil anode segments because of the position of lithium in the electromotive series. The anode segments 30 have flat first and second surfaces 43 and 44 on opposite sides of the anode segments. The first surfaces 43 of the anode segments 30 contact the first surface 3. The anode segments 30 can be formed by, for example, coating lithium on a conductive web material (not shown), such as a copper or a nickel web, or by forming a web (not shown) of lithium or other material and cutting segments from the anodic web to desired lengths.

As shown, in FIG. 2, a plurality of transverse folds 5 are formed in the laminate 1 at predetermined positions, and define a plurality of web segments 11, 12, 13, 14 between successive ones of the transverse folds 5. The transverse folds 5 of the laminate 1 can be formed by perforating portions of the laminate 1. Other methods of creating a weakened portion by the transverse folds 5, such as by skiving or scoring or creasing, are also effective. As shown in FIGS. 9B, 10B, 11B, 12B, and 13B, an electrochemical cell stack 60, such as is shown in FIGS. 9C, 10C, 11C, 12C, and 13C, is manufactured from a laminate 1 having a plurality of transverse folds 5 by fan-folding the laminate 1, at the transverse folds 5, into a stack such that a first side 61 and a second side 62 of the stack are formed. The transverse folds 5 are located at the first and second sides 61 and 62 when the laminate 1 is fan-folded. As shown in FIGS. 3 and 8, the electrochemical cell stack 60 is generally cube-shaped.

As shown in FIGS. 4A, 5A, 6A, 7A, 9A, 10A, 11A, 12A, and 13A, the anode segments 30 are secured on the laminate 1 on top of the electrolyte layer 20 on the first surface 3 between two, not necessarily successive, transverse folds 5, on a first web segment 11 alone, as shown in FIGS. 4A, 5A, 9A, and 10A, or on a first and a second web segment 11, 12 and crossing a transverse fold 5, as shown in FIGS. 6A, 7A, 11A, 12A, and 13A. As shown, for example, by the views FIGS. 9B, 10B, 11B, 12B, and 13B, the laminate 1 is folded lengthwise at the transverse folds 5 in a fan-fold configuration to form the stack 60 such that each anode segment 30 contacts the electrolyte layer 20 on at least part of the first and second surfaces 43, 44 of the anode segment. This permits substantially all of the surface area of the anode segment 30 to be in ion exchange with the continuous cathode layer 2.

Normally, the laminate 1 is fan-folded at transverse folds 5 to form a stack 60 having a repeated pattern 15', 15, 15'', . . . , of four web segments: a first web segment 11', 11, 11'', . . . , a second web segment 12', 12, 12'', . . . , a third web segment 13', 13, 13'', . . . , and a fourth web segment 14', 14, 14'', . . . . The patterns represented by 15' and 15'' are patterns preceding and succeeding, respectively, the pattern 15.

FIGS. 3, 4A, 4B, 5A, 5B, 6A, 6B, 7A, and 7B will first be discussed to illustrate arrangements of anode segments 30 relative to the rest of the laminate 1. In FIGS. 3, 4A, 4B, 5A, 5B, 6A, 6B, 7A, and 7B, aspects of the invention in which the plurality of web segments 11, 12, 13, 14 are all the same length are shown. As shown in FIGS. 4B and 5B, the laminates 1 of FIGS. 4A and 4B are folded such that substantially the entire cathode layer 2 is in ion exchange with a surface of one of the plurality of anode segments 30. The second surface 44 of a first opposite electrode segment 31, attached, by its first surface 43, to the electrolyte layer 20 of the laminate 1 on a first web segment 11, is in contact with the electrolyte layer 20 on a preceding fourth web segment 14' when the laminate 1 is folded to form a stack 60. Further, the second surface 44 of a second opposite electrode segment 32, attached, by its first surface 43, to the electrolyte layer 20 of the laminate 1 on a second web segment 12, is in contact with the electrolyte layer 20 of a third web segment 13. As before, the first and second opposite electrode segments 31 and 32 are anode segments in the preferred embodiment. The second surface 44 of a succeeding first anode segment 31'', attached, by its first surface 43, to the electrolyte layer 20 of the laminate 1 on a succeeding first web segment 11'', is in contact with the electrolyte layer 20 of a fourth web segment 14. The second surface 44 of a preceding second anode segment 32' (not shown), attached, by its first surface 43, to the electrolyte layer 20 of the laminate 1 on a preceding second web segment 12' (not shown), is in contact with the electrolyte layer 20 of a preceding third web segment 13'.

As shown in FIGS. 6B and 7B, the laminates 1 of FIGS. 6A and 7A are folded such that substantially the entire length of the continuous cathode layer 2 is in ion exchange with one of a first or a second surface 43 or 44 of an anode segment 30. The anode segment 30, which is attached by its first surface 43 to the first surface 3 of the laminate 1, on the electrolyte layer 20, on first and second web segments 11, 12, and across a transverse fold line 5, contacts with the first surface 3 on the electrolyte layer 20 on a preceding fourth web segment 14' and a third web segment 13 when the laminate 1 is folded to form a stack 60. The second surface 44 of a succeeding anode segment 30'', also attached, by its first surface 43, to the electrolyte layer 20 of the laminate 1 on succeeding first and second web segments 11'', 12'', is in contact with the electrolyte layer 20 of a fourth web segment 14 and a succeeding third web segment 13".

The discrete anode segments 30 on the laminate 1 are connected to one another in parallel or in series. Current collector strips 50 can be provided and connected to anode segments 30 to provide points for making electrical connections external to the stack 60. Similarly, portions of the continuous cathode layer 2 on the second surface 4 of the laminate 1 are exposed toward the outside of the stack 60 on the second side 62 of the stack and a secondary current collector 75 contacts the cathode layer at one or more points along the length of the stack.

With reference, to FIGS. 4A and 4B, a current collector strip 50 is attached to first and second anode segments 31, 32 across a transverse fold 5. When the laminate 1 is folded into a stack 60, a portion 51 of each of the current collector strips 50 extends past a side 61 of the stack 60 and is connected to a primary current collector 70.

As shown in FIGS. 5A and 5B, current collector strips 50 attached to each anode segment 31 and 32. The electrochemical cell stack 60 shown in perspective view in FIG. 3 corresponds to the side view of FIG. 5B and can be formed from the laminate of FIG. 5A. Portions 51 of the current collector strips 50 extend transversely from the left side 6 or the right side 7 of the laminate 1. When the laminate 1 is fan-folded to form the stack 60, the portions 51 of the current collector strips 50 extend from the stack and can be connected to one another electrically by the primary current collector 70.

Because the current collector strips 50 have a certain thickness, the stacks 60 formed by fan-folding the laminate 1 can become lopsided as multiple current collector strips are stacked one atop the other. However, in FIGS. 6A and 6B, no current collector strip 50 is provided. Instead, the anode segments 30 extend across the transverse folds 5. No current collector strips 50 are provided. The anode segments 30 are of sufficient area and flexibility such that, when the laminate 1 is folded to form the stack 60, a portion of each of the plurality of anode segments about the transverse fold line 5 extends substantially past the remainder of the side 61 of the stack 60, thereby allowing connection of all of the anode segments directly to the primary current collector 70.

As shown in FIGS. 7A and 7B, current collector strips 50 are connected to each anode segment 30 substantially at or near the position where the anode segment 30 crosses the transverse fold line 5. Portions 51 of the current collector strips 50 extend transversely from the left side 6 or the right side 7 of the laminate 1. When the laminate 1 is fan-folded to form the stack 60, the portions 51 of the current collector strips 50 extend from the stack and can be connected to one another electrically.

As shown in FIGS. 8, 9A, 9B, 9C, 10A, 10B, 10C, 11A, 11B, 11C, 12A, 12B, 12C, 13A, 13B, and 13C, the third and fourth web segments 13, 14 are each the same length, and the first and second web segments 11, 12 are each the same length, and the first and second web segments 11, 12 are each longer than the third or fourth web segments 13, 14 by a predetermined distance. As shown in FIG. 8, a perspective view of an electrochemical cell stack 60 that is formed with longer first and second web segments 11, 12 than third and fourth web segments 13, 14 is shown. Although the electrochemical cell stack 60 corresponds to the embodiment of the invention shown in FIGS. 9A, 9B, and 9C, the embodiments shown in FIGS. 10A, 10B, 10C, 11A, 11B, 11C, 12A, 12B, 12C, 13A, 13B, and 13C form similarly-shaped stacks. When the laminate 1 is folded into a stack 60, the transverse fold 5 defining the first and second web segments 11, 12 extends slightly past the transverse fold 5 defining the third and fourth web segments 13, 14, due to the differences in length of those segments. Because spaces are formed between the transverse fold 5 defining the first and second web segments 11, 12 and the transverse folds 5', 5" defining the preceding first and second web segments 11', 12' and the succeeding first and second web segments 11", 12" due to the extended lengths of the first and second web segments, the current collector strips 50 can be fitted in the spaces to avoid lopsided stacks due to the thickness of multiple current collector strips. More particularly, the current collector strips 50 can be fitted in the spaces to stabilize the portions of the first and second web segments 11, 12 that are extended a predetermined length past the transverse fold positions of the third and fourth web segments 13, 14. As so fitted, the current collector strips reduce deformation of the extended lengths.

As shown in FIGS. 9A, 9B, and 9C, current collector strips 50 are attached to second anode segments 32', 32, and 32" near transverse fold lines 5. A portion of the current collector strip 51 extends from the left or right sides 6, 7 of the laminate 1. The current collector strip 50 can also extend across the transverse fold line 5 but not be attached to the first anode segment 31. As shown in FIGS. 9B and 9C, the current collector strip 50 is positioned on the extended length of the second anode segment 32 and is of a sufficient thickness such that, when the laminate 1 is folded to form the stack 60, the current collector strip will contact with a succeeding first anode segment 31". The protruding portions 51 of the current collector strips 50 can be connected electrically by the primary current collector 70.

As shown in FIGS. 10A, 10B, and 10C, the current collector strips 50 are attached across transverse fold lines 5 for connecting the first and second anode segments 31, 32. The current collector strips 50 can be positioned so that they are fit on the extended length of the first and second web segments 11, 12, and do not contact other web segments to cause lopsided stacks 60. The thickness of the current collector strips 50 causes them to protrude slightly from the side 61 of the stack 60 so that they can be connected to one another electrically by the primary current collector 70.

As shown in FIGS. 11A, 11B, and 11C, a current collector strip 50 is connected to anode segments 30 which cross transverse folds 5 by the extended length of the second web segment 12. As in FIGS. 9A, 9B, and 9C, the current collector strip 50 can be sufficiently thick such that, when the laminate 1 is fan-folded to form the stack 60, the current collector strip on the anode segment 30 on the second web segment 12 contacts the succeeding anode segment 30" on the succeeding first web segment 11" so that the plurality of anode segments are in electrical contact. Alternatively, electrical contact between the anode segments 30 can be achieved externally from the stack by means of the primary current collector 70 contacting all of the anode segments.

As shown in FIGS. 12A, 12B, and 12C, and similarly to the embodiment described with reference to FIGS. 6A and 6B, anode segments 30 extend across transverse folds 5. No current collector strips 50 are provided. The anode segments 30 are electrically connected to one another by the primary current collector 70 which contacts the anode segments at the transverse fold 5. Contact between the primary current collector 70 and the portions of the anode segments 30 by the transverse folds 5, and not the portions of the electrolyte layer 20 by the transverse folds, is facilitated by the extended length of the first and second web segments 11, 12 beyond the length of the third and fourth web segments 13, 14.

As shown in FIGS. 13A, 13B, and 13C, anode segments 30 extend across transverse folds 5. Current collector strips 50 are attached near or across the transverse folds by the extended portion of the first and second web segments 11, 12. When the laminate 1 is folded to form the stack 60, the current collector strips 50 are connected to the primary current collector 70 to connect the anodes 30 electrically.

An electrochemical cell stack can be made by coating the cathode material 2' of the continuous cathode layer 2 with a continuous electrolyte layer 20. A plurality of anode segments 30 are secured on the surface 3 of the continuous electrolyte layer 20 to form the laminate 1. The plurality of anode segments 30 are secured in predetermined locations on the laminate 1. The laminate 1 is fan-folded at predetermined transverse fold positions 5 such that the anode segments 30 contact the electrolyte layer 20 on first and second sides 43 and 44 of the anode segments 30. The fan-folding forms a stack 60 having first and second sides 61 and 62. Anode current collector means 70 are attached to the anode segments 30 in predetermined locations and cathode current collector means 75 are attached to the cathode layer 2. The anode segments 30 can be laminated across predetermined transverse fold positions 5.

Electrochemical cell stacks 60 can be formed with desired power characteristics by making larger or smaller stacks. The power characteristics of the stacks 60 can be varied by, for example, altering the area for ion exchange between the anode layers 30 and the cathode layers 2. Stacks 60 can for instance, be made with more or fewer repeated patterns 15', 15, and 15". Further, the width of the laminate 1 or the distance between successive transverse folds 5 can be made greater or smaller. The ability to vary the height and width characteristics of the electrochemical cell stack 60 while attaining particular desired power characteristics facilitates use of the electrochemical cell stack in a wide variety of applications where space for batteries is limited.

The electrochemical cell stack 60 formed from the laminate 1 can be quickly assembled by fan-folding the laminate such that the discrete anode segments contact the electrolyte layer over substantially all of the surfaces of both sides 43, 44 of the anode segments. Such an electrochemical cell stack 60 can have a greater energy density, in Watt-hours per kilogram and Watt-hours per liter, than comparable liquid electrolyte batteries.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. An electrochemical cell stack, comprising:
a continuous laminate web, the continuous laminate web having one continuous first polarity electrode layer, one continuous electrolyte layer, and a plurality of discrete second polarity electrode segments secured on top of the electrolyte layer in predetermined locations, the continuous laminate web being fan-folded at predetermined fold positions such that the second polarity electrode segments contact the electrolyte layer on top and bottom sides of each of the second polarity electrode segments, the fan-folded continuous laminate web forming a stack having first and second sides;
second polarity electrode current collector means for collecting second polarity electrode current; and
first polarity electrode current collector means for collecting first polarity electrode current.

2. The electrochemical cell stack of claim 1, wherein the web is fan-folded at the fold positions such that every other fold position on the first side of the stack extends past a preceding and a succeeding fold position on the first side of the stack a predetermined extended length.

3. The electrochemical cell stack of claim 2, wherein the second polarity electrode current collector means includes a first second polarity electrode current collector member attached to a first second polarity electrode segment at a first extended length, the first second polarity electrode current collector member being in electrical contact with a second second polarity electrode segment at a second extended length.

4. The electrochemical cell stack of claim 3, wherein the first second polarity electrode segment extends across the first extended length and the second second polarity electrode segment extends across the second extended length.

5. The electrochemical cell stack of claim 4, wherein a portion of the first second polarity electrode current collector member extends from the first side of the stack.

6. The electrochemical cell stack of claim 4, wherein the second polarity electrode current collector means includes a second second polarity electrode current collector member attached to a third second polarity electrode segment at a third extended length, the second second polarity electrode current collector member being in electrical contact with a fourth second polarity electrode segment at a fourth extended length, and the first second polarity electrode current collector member is in electrical contact with the second second polarity electrode current collector member at a point outside of the stack.

7. The electrochemical cell stack of claim 3, wherein the second polarity electrode current collector means includes a second second polarity electrode current collector member attached to a third second polarity electrode segment at a third extended length, the second second polarity electrode current collector member being in electrical contact with a fourth second polarity electrode segment at a fourth extended length, and the first second polarity electrode current collector member is in electrical contact with the second second polarity electrode current collector member at a point outside of the stack.

8. The electrochemical cell stack of claim 1, wherein a portion of the first polarity electrode current collector means contacts a portion of the first polarity electrode layer on the second side of the stack.

9. The electrochemical cell stack of claim 1, wherein the second polarity electrode current collector means includes a first second polarity electrode current collector member, and the first second polarity electrode current collector member contacts a first and a second second polarity electrode segment and extends across a first fold position such that a point on the first second polarity electrode current collector member extends beyond the first side of the stack.

10. The electrochemical cell stack of claim 9, wherein the second polarity electrode current collector means includes a second second polarity electrode current collector member, and the second second polarity electrode current collector member contacts a third and a fourth second polarity electrode segment and extends across a second fold position such that a point on the second second polarity electrode current collector member extends beyond the first side of the stack, and the first and the second second polarity electrode current collector member are in electrical contact.

11. The electrochemical cell stack of claim 1, wherein a first second polarity electrode segment extends across a first fold position and a portion of the first second polarity electrode segment extends past the first side of the stack, and the second polarity electrode current collector means is in electrical contact with the portion of the first second polarity electrode segment.

12. The electrochemical cell stack of claim 11, wherein a second second polarity electrode segment extends across a second fold position and a portion of the second second polarity electrode segment extends past the first side of the stack, and the second polarity electrode current collector means is in electrical contact with the portion of the second polarity electrode segment.

13. A laminate for forming an electrochemical cell stack, comprising:
one continuous first polarity electrode layer having a first and a second surface;
one continuous electrolyte layer having a first and a second surface, the first surface of the electrolyte layer being attached to the second surface of the first polarity electrode layer;
a plurality of discrete second polarity electrode segments each having a first and a second surface, the first surface of each second polarity electrode segment being secured on the second surface of the electrolyte layer;
the laminate being foldable at a plurality of predetermined fold positions such that at least a portion of the second surface of each second polarity electrode segment contacts a portion of the second surface of the electrolyte layer.

14. The laminate of claim 13, wherein the predetermined fold positions are defined by perforations.

15. The laminate of claim 13, wherein the predetermined fold positions are defined by scoring.

16. The laminate of claim 13, further comprising an second polarity electrode current collector means including a plurality of second polarity electrode current collector members, an second polarity electrode current collector member being attached to a first one of every set of two second polarity electrode segments and adapted to contact a second one of every set of two second polarity electrode segments when the laminate is folded at the plurality of fold positions.

17. The laminate of claim 16, wherein the plurality of second polarity electrode current collectors are adapted to be in electrical contact with one another when the laminate is folded at the plurality of fold positions.

18. The laminate of claim 13, further comprising an second polarity electrode current collector means, the second polarity electrode current collector means including a plurality of second polarity electrode current collector members attached to every one of the plurality of second polarity electrode segments, the plurality of second polarity electrode current collector members being adapted to be in electrical contact with one another when the laminate is folded at the plurality of fold positions.

19. A method of making an electrochemical cell stack, comprising the steps of:
coating a top surface of one continuous first polarity electrode layer with one continuous electrolyte layer;
securing a plurality of second polarity electrode segments on a top surface of the continuous electrolyte layer to form a laminate, the plurality of second polarity electrode segments being secured in predetermined locations on the laminate;
fan-folding the laminate at predetermined fold positions such that the second polarity electrode segments contact the electrolyte layer on first and second sides of the second polarity electrode segments, the fan-folding forming a stack having first and second sides; and
attaching second polarity electrode current collector means to the second polarity electrode segments in predetermined locations and first polarity electrode current collector means to the first polarity electrode layer.

20. The method of claim 19, wherein the second polarity electrode segments are laminated across predetermined fold positions.

21. The method of claim 19, wherein the laminate is fan-folded at the fold positions such that every other fold position on the first side of the stack extends past a preceding and a succeeding fold position on the first side of the stack a predetermined extended length.

22. A method of making a laminate for making an electrochemical cell stack, comprising the steps of:
coating a top surface of one continuous first polarity electrode layer with one continuous electrolyte layer; and
securing a plurality of second polarity electrode segments on a top surface of the continuous electrolyte layer, the plurality of second polarity electrode segments being secured in predetermined locations.

23. The method of claim 22, comprising the further step of attaching second polarity electrode current collector means to the second polarity electrode segments in predetermined locations and first polarity electrode current collector means to the first polarity electrode layer.

24. The electrochemical cell stack of claim 1, wherein the first polarity electrode is a cathode and the second polarity electrode segments are anodes.

25. The electrochemical cell stack of claim 1, wherein the first polarity electrode is an anode and the second polarity electrode segments are cathodes.

26. The laminate of claim 13, wherein the first polarity electrode is a cathode and the second polarity electrode segments are anodes.

27. The laminate of claim 13, wherein the first polarity electrode is an anode and the second polarity electrode segments are cathodes.

28. The method of claim 19, wherein the continuous first polarity electrode layer is cathodic and the second polarity electrode segments are anodic.

29. The method of claim 19, wherein the continuous first polarity electrode layer is anodic and the second polarity electrode segments are cathodic.

30. The method of claim 22, wherein the continuous first polarity electrode layer is cathodic and the second polarity electrode segments are anodic.

31. The method of claim 22, wherein the continuous first polarity electrode layer is anodic and the second polarity electrode segments are cathodic.

* * * * *